United States Patent
Cory

(10) Patent No.: US 9,044,859 B2
(45) Date of Patent: Jun. 2, 2015

(54) METHOD FOR GAIT GENERATION AND TRACKING CONTROL FOR A BIPEDAL WALKING ROBOT

(71) Applicant: DISNEY ENTERPRISES, INC., Burbank, CA (US)

(72) Inventor: Rick E. Cory, Burbank, CA (US)

(73) Assignee: DISNEY ENTERPRISES, INC., Burbank, CA (US)

(*) Notice: Subject to any disclaimer, the term of this patent is extended or adjusted under 35 U.S.C. 154(b) by 0 days.

(21) Appl. No.: 14/068,195

(22) Filed: Oct. 31, 2013

(65) Prior Publication Data

US 2015/0120044 A1 Apr. 30, 2015

(51) Int. Cl.
G05B 19/04 (2006.01)
B25J 9/16 (2006.01)
A61F 2/70 (2006.01)

(52) U.S. Cl.
CPC .............. B25J 9/163 (2013.01); *Y10S 901/01* (2013.01)

(58) Field of Classification Search
USPC .............. 700/261, 250, 245; 623/24, 40; 318/568.12, 567
See application file for complete search history.

(56) References Cited

U.S. PATENT DOCUMENTS

| | | | |
|---|---|---|---|
| 5,355,064 A | 10/1994 | Yoshino et al. | |
| 5,357,433 A | 10/1994 | Takenaka et al. | |
| 8,500,823 B2* | 8/2013 | Herr et al. | 623/39 |
| 8,512,415 B2* | 8/2013 | Herr et al. | 623/24 |
| 8,805,583 B2* | 8/2014 | Lim et al. | 700/254 |
| 8,864,846 B2* | 10/2014 | Herr et al. | 623/25 |
| 8,870,967 B2* | 10/2014 | Herr et al. | 623/24 |
| 8,874,263 B2* | 10/2014 | Kwak et al. | 700/245 |
| 8,880,221 B2* | 11/2014 | Lee et al. | 700/255 |
| 2004/0049290 A1* | 3/2004 | Bedard | 623/24 |
| 2005/0085948 A1* | 4/2005 | Herr et al. | 700/258 |
| 2007/0016329 A1* | 1/2007 | Herr et al. | 700/250 |
| 2007/0145930 A1* | 6/2007 | Zaier | 318/568.12 |
| 2012/0245734 A1 | 9/2012 | Yun et al. | |

(Continued)

OTHER PUBLICATIONS

Koolen, et al. "Capturability-based analysis and control of legged locomotion, Part 1: Theory and application to three simple gait models," The International Journal of Robotics Research 2012 31: 1094 originally published online Jul. 3, 2012.

(Continued)

*Primary Examiner* — Ronnie Mancho
(74) *Attorney, Agent, or Firm* — Marsh Fischmann & Breyfogle LLP; Kent A. Lembke

(57) ABSTRACT

A control method that executes a numerical non-linear optimization procedure with forward simulation of the full dynamics of the bipedal robot (including ground collisions) to compute a foothold, which produces the desired center of mass velocity during the next step of the walking cycle. The controller includes a gait generator that outputs desired joint trajectories designed to track a desired foothold provided by the foot placement algorithm. A torque calculator is included to output desired joint torques designed to track the desired joint trajectories provided by the gait generator. Additionally, the controller includes an actuator controller that produces the desired joint torques determined by the torque calculator at each joint on the physical robot, which may be a legged robot with torque-controlled joints. The foot placement algorithm may use nonlinear optimization that is solvable using a mathematical model of the dynamics of the controlled robot.

23 Claims, 6 Drawing Sheets

(56) References Cited

U.S. PATENT DOCUMENTS

2012/0310412 A1    12/2012   Seo et al.
2013/0310979 A1*  11/2013   Herr et al. ..................... 700/258

OTHER PUBLICATIONS

Pratt, et al. "Capturability-based analysis and control of legged locomotion, Part 2: Application to M2V2, a lower body humanoid," The International Journal of Robotics Research, 2012 31: 1117 originally published online Aug. 6, 2012.

Wight, et al. "Introduction of the Foot Placement Estimator: A Dynamic Measure of Balance for Bipedal Robotics," Journal of Computational and Nonlinear Dynamics, Jan. 2008, vol. 3, pp. 011009-1-011009-10.

Zutven, et al. "Foot placement for Planar Bipeds with Point Feet," 2012 IEEE International Conference on Robotics Automation, RiverCentre, Saint Paul, Minnesota, USA, May 14-18, 2012.

Yun, et al. "Momentum-Based Reactive Stepping Controller on Level and Non-level Ground for Humanoid Robot Push Recovery," Intelligent Robots and Systems (IROS), 2011 IEEE/RSJ International Conference on Intelligent Robots and Systems, pp. 3943,3950, Sep. 25-30, 2011.

* cited by examiner

METHOD FOR GAIT GENERATION AND TRACKING CONTROL FOR A BIPEDAL WALKING ROBOT

BACKGROUND

1. Field of the Description

The present description relates, in general, to bipedal legged robots (e.g., biped humanoid robots), and, more particularly, to a method for providing proper foot placement for such robots to allow legged locomotion and balancing (either planar or non-planar) through control of force-controllable joints.

2. Relevant Background

A bipedal legged robot is a robot that can walk and/or balance on two legs. In general, a bipedal robot has two legs with a plurality of joints and some form of foot (but not necessarily flat) that makes contact with the ground. Bipedal robots may be formed with many rigid links that are interconnected by joints that are operated or positioned by applying a force or torque to each joint to move and position a robot. Similarly, other legged robots such as those with three, four, or more legs also may walk utilizing force-controlled movement of their legs.

In order to walk and balance, bipedal robots require safe and compliant control of the force-controlled joints. In this regard, a controller is provided for each robot that has to be programmed to determine desired motions and desired output forces (contact forces) and, in response, command the actuators to output these desired joint torques to effectively control movement and positioning of the bipedal robot. A robot may include a sensor at each joint that is used to provide input to the controller for identifying or determining joint angles and velocities, and these joint angles and velocities are kinematic parameters used to control the robot through movement of its joints. In other cases, the sensors can also be offboard the robot. For example, one can use a motion capture camera system to compute and communicate joint position and velocity information back to the controller instead of having the sensors directly on the robot itself. Particularly, foot sensors may be provided on a bipedal robot to provide information about foot contact with the ground.

While significant work has been undertaken with regard to bipedal robots, there remains a need for improved methods for controlling legged robots. Preferably, the methods would be useful in an onboard robot controller to generate foot placements that may be used by other controller components to generate torques for the motors of the various robot joints to provide a walking movement while maintaining the balance of the legged robot (e.g., a bipedal or humanoid robot or a robot with four or more legs).

SUMMARY

The present description is for a control method that is well-suited for controlling planar walking operations of bipedal robots such as torque-controlled bipedal walkers. The control method provides an improved foot placement strategy that facilitates gait generation for the robot, which enables determination of the torque values for controlling each joint of the robot to affect balanced, sagittal-plane walking on flat ground. This method may also be extended to the frontal-plane to achieve three dimensional walking. The control method has proven effective with a bipedal walker with four actuated degrees of freedom: two for its hips and two for its knees. The bipedal walker used to test the control method had a passive degree of freedom at the torso connected to a boom, which allowed it to have free translational and rotation motion in the sagittal plane.

To implement the control method, a robot controller may include a foot placement algorithm to produce a desired foothold location on the ground (e.g., a planar support surface). The controller may also include a gait generator that outputs desired joint trajectories designed to track a desired foothold provided by the foot placement algorithm. Further, the controller may use a torque calculator that is adapted to output desired joint torques designed to track the desired joint trajectories provided by the gait generator. Additionally, the controller may include an actuator controller that produces the desired joint torques determined by the torque calculator at each joint on the physical robot (which may be a legged robot with torque-controlled joints, e.g., with electric motors providing desired torques to cause the robot to walk). Stated differently, the control method described uses a gait generation strategy that uses foot placement as an input and gait (or joint trajectories), and, further, the control method uses a tracking controller to produce the required torques using a model of the robot dynamics as additional input.

A basis of the control method (or control approach) taught herein is the need for providing appropriate foot placement for walking and balancing of a legged robot. Foot placement control, at the high level, uses a foot placement algorithm to provide a strategy for foot placement during walking. At a lower level, foot placement control may use a separate controller to realize the whole-body motion of the robot that results in the desired foot placement. The control method or approach for robot controllers may utilize a coupling between the uncontrolled degree of freedom of the robot (e.g., the point foot) and the internal controlled degrees of freedom.

Briefly, a new method is provided for computing foot placements for bipedal walking and balancing. The method relies on an algorithm that computes the appropriate foot placement location ("foot-hold" or gait reference point (GRP)). The GRP method may be considered an improvement over prior control methods that did not take into account the dynamics of the walking motion itself when computing a foot-hold. In practicing the GRP method, given a desired walking speed of the robot, the GRP method executes a numerical non-linear optimization procedure with forward simulation of the full dynamics of the bipedal robot (including ground collisions) to compute a foot-hold or GRP, which attempts to produce the desired center of mass velocity during the next step of the walking cycle.

According to one aspect of the description, a method is provided for controlling a legged robot, e.g., one with torque-controlled joints. The method includes determining a foot hold location on a support surface (planar section of ground or the like) for a foot of the legged robot. The method also includes generating a set of joint trajectories for joints of the legged robot to achieve the foot hold location. Then, the method includes computing desired torques to provide the set of joint trajectories, and generating actuator commands to operate actuators on the legged robot to provide the desired torques to move the foot of the legged robot to the foot hold location.

In some implementations of the method, the determining of the foot hold location includes performing nonlinear optimization with a state of the legged robot as a first input and a mathematical model of the legged robot providing constraints for the nonlinear optimization as a second input. For example, the nonlinear optimization may include performing forward prediction using the mathematical model of the legged robot including robot dynamics and a model of ground collisions between the foot and the support surface including energy losses during the ground collisions. Further, in some cases, the constraints may include torque limits of actuators or motors used for driving the joints of the legged robot.

In practice, it may be useful for the generating of the set of joint trajectories to be performed with a stance knee of the legged robot locked in a straight position. However, in non-humanoid type bipeds, one can choose a different configuration (or trajectories) for the joints in the stance leg of the robot. In the same or other implementations, the generating of the set of joint trajectories may involve generating an inner leg angle trajectory using a sine wave parameterized by a phase variable. In such cases, the phase variable can be taken to be an amount of time elapsing during a step of the legged robot.

Also, in some implementations of the method (e.g., by operation of a robot controller), the generating of the set of joint trajectories may further include defining movement of a swing knee as a Bézier Curve parameterized by the inner leg angle trajectory. In these or other cases, the computing of the desired torques can include using a proportional-derivative (PD) torque controller to track the foot hold location and further using partial-feedback linearization. In these implementations or embodiments, the partial-feedback linearization may use a mathematical model of the dynamics of the legged robot to compute the desired torques based on the coupling between the actuated and non-actuated joints.

According to another aspect of the description, a robot controller is described for providing actuator control signals to motors or actuators used to drive joints or linkages of a legged robot during walking on a surface. The controller includes: (a) a foot placement algorithm module generating a foot-hold location on the ground for a foot of the legged robot, with the foot-hold location being generated by processing a state of the legged robot and a set of dynamic constraints of the legged robot; (b) a gait generation algorithm module generating a desired state of the legged robot based on the foot-hold location and the state of the legged robot; and (c) a torque control module generating commands to the motors or actuators of the legged robot to achieve the desired state of the legged robot including positioning the foot at the foot-hold location on the ground.

In some implementations, the robot controller also includes a partial feedback linearization module that is adapted for processing the desired state of the legged robot concurrently with a model of the dynamics of the legged robot to produce desired torques for the motors or actuators so as to achieve the desired state of the legged robot. In these implementations, the torque control module may generate the commands based on the desired torques.

In some cases, the set of dynamic constraints includes torque limits and joint limits. Then, the foot-hold location may be determined by computing the GRP using nonlinear optimization. In these or other cases, the generating of the desired state of the legged robot may be performed by holding the stance knee straight and by defining an inner leg angle to achieve the foot-hold location as a linear Bézier Curve. Then, the Bézier parameterization variable of the linear Bézier Curve can be defined by a sine wave that is parameterized by a desired swing time and a step time or that is parameterized by stance leg angle.

DETAILED DESCRIPTION OF THE PREFERRED EMBODIMENTS

Briefly, a control method, and controllers that implement such a control method, are described for use with legged robots such as force or torque-controlled, biped humanoid robots or walkers with 2 legs. The control method may be considered a foot placement control method, and, as such, the following description discusses a number of foot placement strategies that may be used to control a robot during walking operations.

Figure 1:
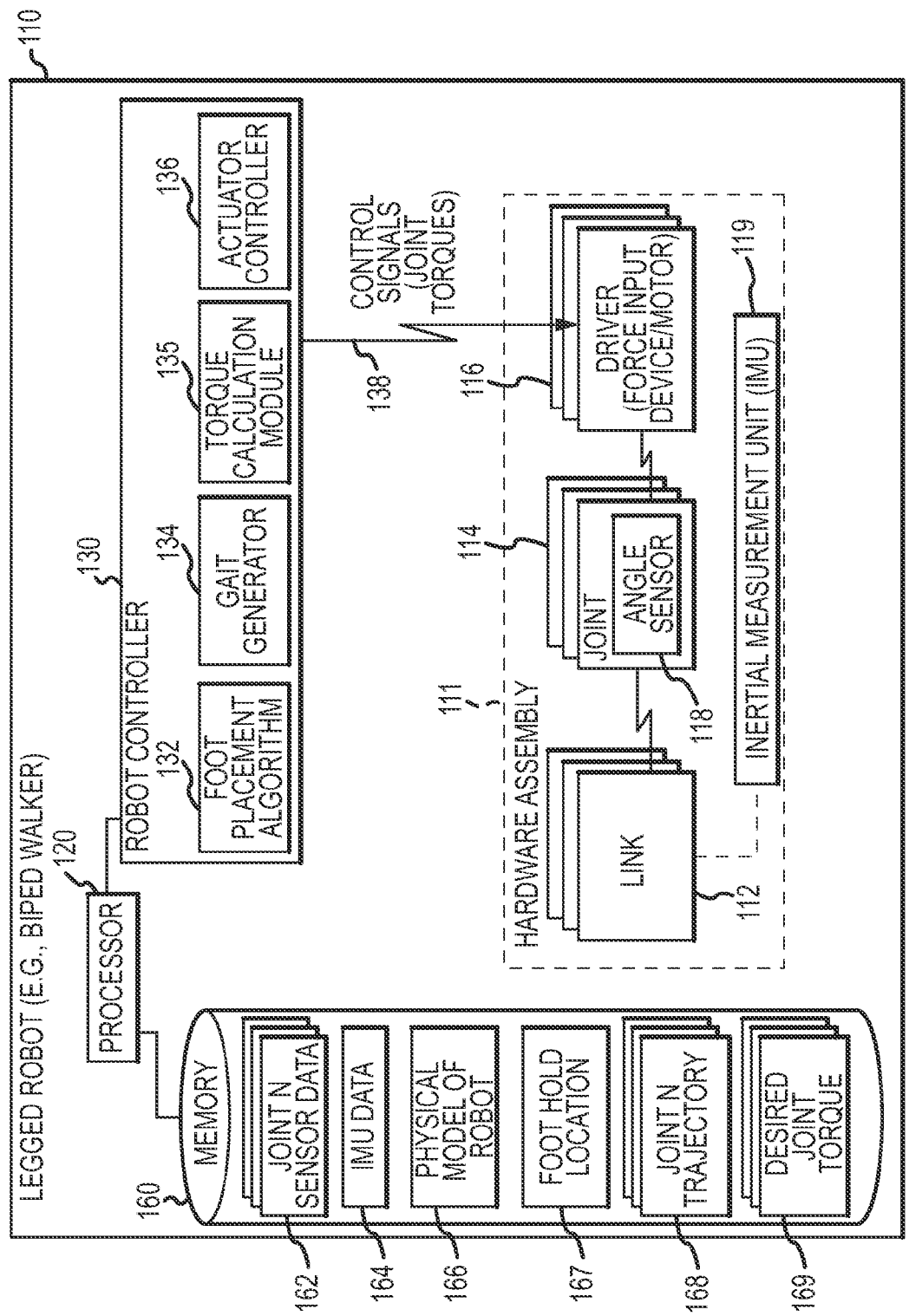
FIG. 1 is a functional block diagram of a legged robot (e.g., a planar biped walker or the like) including software or computer code of a robot controller that may be run to control the robot for use in generating joint torques or other control signals based on foot-hold location predictions and gait generation (e.g., desired joint trajectories to achieve desired foot-holds)

FIG. 1 illustrates a functional block diagram of a legged robot (such as a biped humanoid robot or a biped walker) 110 that may have its walking controlled with the control methods taught herein. Generally, the control methods may be used with nearly any bipedal robot 110 that is a force-controlled or torque-controlled robot that can be freely moved such as by moving its leg or other joints while satisfying predefined constraints, e.g., a foot on a floor or other planar support platform.

As shown, the robot 110 includes a hardware assembly (or set of hardware/mechanical components with sensors) 111, which include a number of rigid links 112 that are joined or interconnected and movable with joints 114. The links 112 may be moved and positioned by operating a driver 116 (e.g., a force input device such as an electric motor, an actuator, or the like) to apply a joint torque on the joint 114 in response to control signals (joint torques) 138 received from a robot controller 130 (or its actuator controller 136). Angle sensors 118 are provided at each joint 114 to output data or measurements indicative of an angle at the joint 114, and the joint angle measurement or sensor data 162 is stored in memory 160 of the robot 110. In some cases, an inertial measurement unit (IMU) 119 is provided on a link 112 of the robot 110 such as on a pelvis link 112, and the IMU 119 provides data 164 also stored in memory 160 that may be used to determine link orientations by a calibration program (not shown in FIG. 1). The links 112, in the case of a biped walker, may include a pair of feet with no ankle joint, and, during walking, one these links 112 may be constrained to be on a floor or other planar support platform (not shown in FIG. 1). The feet will also include some sort of contact sensing, e.g., pressure sensors or switches.

For example, one implementation of the robot 110 used a planar bipedal robot for the hardware assembly 111. This bipedal robot had a total of four actuated degrees of freedom, with two for its hips and two for its knees. The torso was connected to a carbon fiber boom, which was used to constrain the robot's movements (walking and falling) to lie strictly in the sagittal plane. The majority of this robot was manufactured out of 70/75 aluminum and had a total combined weight (including the boom) of approximated 38.5 pounds.

Figure 2:
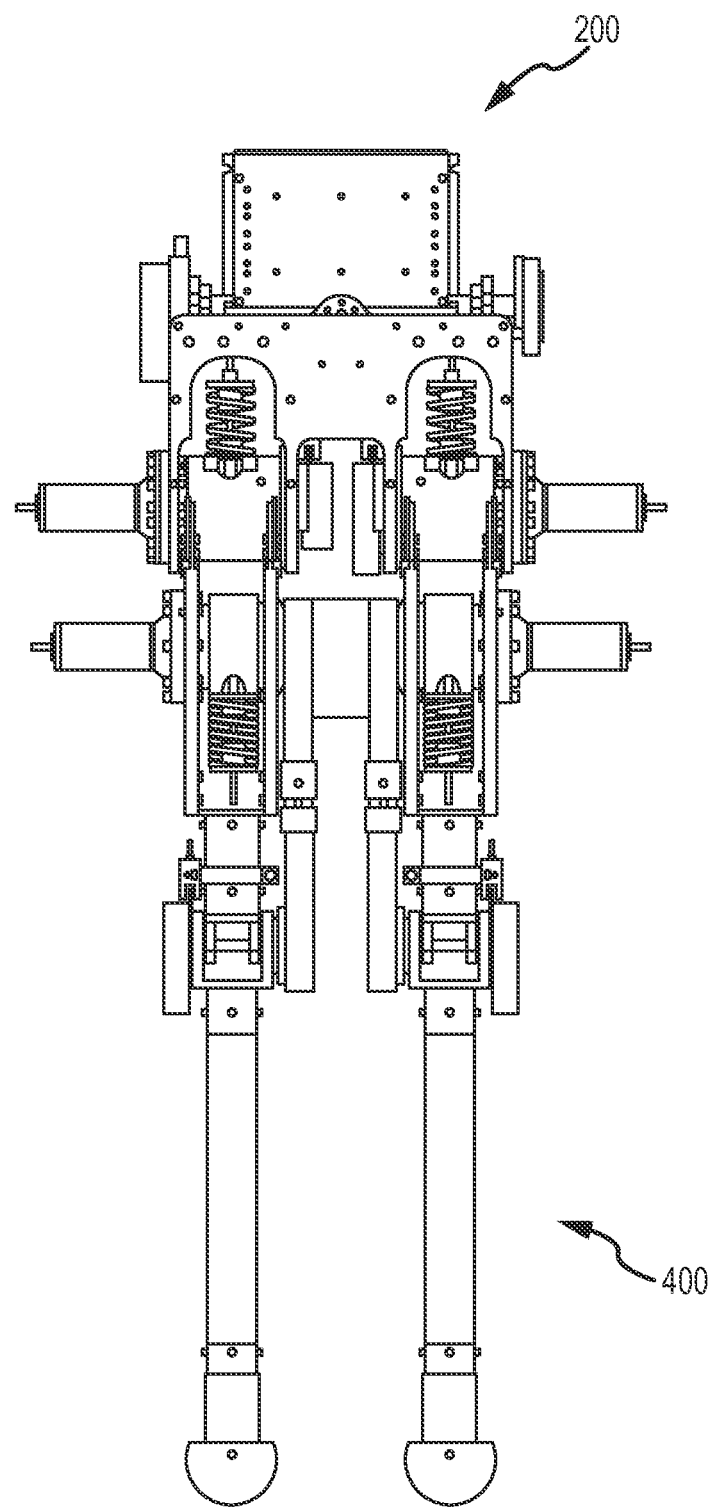
FIG. 2 illustrates a partial view of a planar biped walker that may be controlled to walk in a balanced manner via use of a robot control method described herein (e.g., by inclusion of a robot controller as described with reference to FIG. 1)
Figure 3:
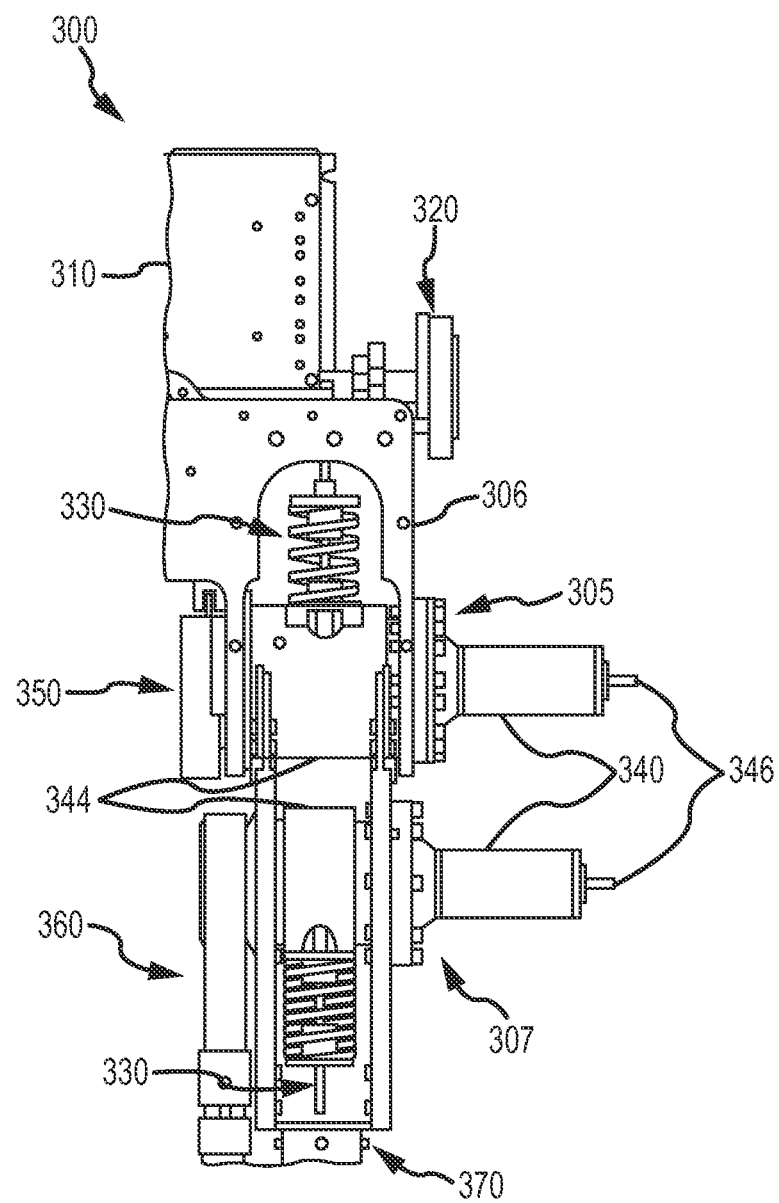
FIG. 3 is a detailed view of a portion of the body/torso of the walker of FIG. 2 showing components of a hip and knee of the robot/walker.
Figure 4:
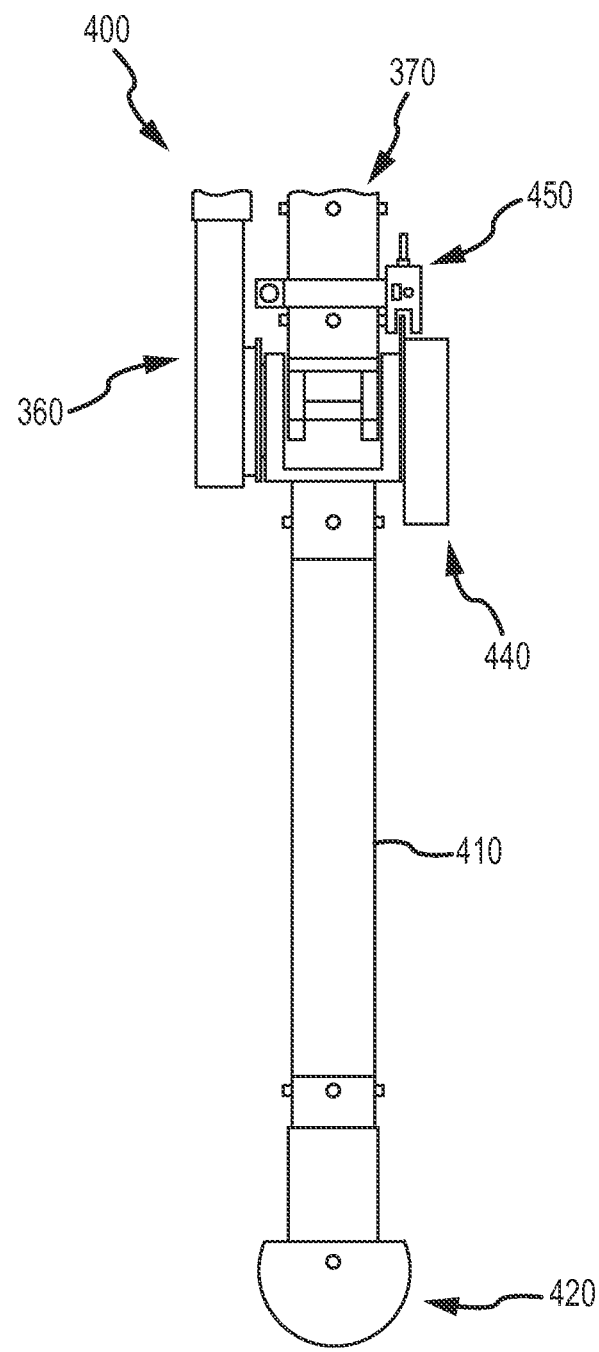
FIG. 4 illustrates a detailed view of a leg assembly/portion of the walker/robot of FIGS. 2 and 3.

FIG. 2 illustrates one example of such a planar bipedal robot or walker 200 that may be used for the assembly 111 of robot 110 of FIG. 1, and FIG. 3 illustrates an enlarged view of a portion 300 of the robot's body/torso while FIG. 4 illustrates an enlarged view of one of the robot's legs 400. As shown in FIGS. 2 and 3, the robot 200 includes motor controllers 310 used to control four electric motors 340 (e.g., Maxon Motor U.S.A brushless EC-4 pole, 30 mm, 200 W or the like), which actuate the hips 305 and knees 307, and the motors 340 were designed to sit high up on the body 300 so as to minimize the inertia of the legs 400 during swing. The hip actuators are collocated with the hip degrees-of-freedom (see FIGS. 2 and 3), and the knees 307 are driven through a timing-belt transmission.

As shown in FIG. 3, the robot's body 300 further includes a boom attachment 320 to limit movements to the sagittal plane with a boom (not shown). The body portion 300 includes gear boxes (e.g., 100:1 that may be provided with a CSG-14-100-2UH gear box from Harmonic Drive L.L.C. or the like) 344 linked to motors 340. Linear springs 330 are used to connect the gear boxes to the hip frame 306 and to the leg link 410 via knee frame element 370. Further, the body portion 300 is shown to include load encoders 350 (e.g., 2000 cnts/rev (4x) as may be provided with an E6-2500-236-IE-D-H-D-3 encoder from US Digital Corporation or the like), and the portion 300 also includes a timing belt 360.

FIG. 4 shows that the leg or leg assembly 400 is linked to the knee 307 via frame element 370 and timing belt 360. The leg 400 includes a load encoder 440 as well as a homing sensor 450 (e.g., an EE-SX672-WR 1M homing sensor from Omron Photomicrosensors or the like). The leg 400 includes a elongated leg link or member 410 that extends from the knee 307 to a foot 420, e.g., a polyurethane foot, and the foot 420 may include a force sensor (not shown but may be provided in the form of a FSR 408 force sensor from Interlink Electronics or the like).

As can be seen in FIGS. 2-4, motor controller electronics are carried onboard the robot, but, in this case, computation and power were supplied from offboard assemblies in order to maintain a more manageable weight (e.g., the robot 110 of FIG. 1 may be configured with all components onboard or with some offboard). Point feet are a common attribute in planar walkers, and these were adopted in the design of the robot 200 as well. This was done to keep the design of the legs relatively simple and lightweight. It also emphasized the underactuated nature of the walking control problem without the need of a mechanical foot capable of toe-off. The round feet 420 of the robot 200 were molded and poured out of polyurethane rubber. A number of rubber hardness indices were experimentally tested in order to find a useful set of compliance and damping characteristics that would avoid or lessen foot bounce during collision in addition to providing sufficient friction to mitigate foot slip (e.g., Vytaflex 20 urethane rubber from Reynolds Advanced Materials or the like may be used for foot 420).

Each powered degree-of-freedom can be driven by a series-elastic-actuator (SEA). SEAs have been popular since their introduction and have become a common form of actuation for bipedal robots. One advantage of using SEAs is that they provide a mechanism for controlling output torque. This is done by modulating the deflection of a spring springs 330 placed between the motor and the output load, thus allowing one to transform a force-control problem into a position-control problem. Another advantage is that the series springs help isolate the rigid gear train from the impulsive forces that arise during foot collisions in normal walking, which might otherwise cause damage to the gear train or other parts of the rigid assembly.

In the robot 200, torque was controlled at the hips 305 and knees 307 through a set of SEAs. The SEA design may include a chain/pulley design with a pair of linear compression springs (e.g., each spring 330 is actually a pair of springs connected via a belt/chain coupled to a socket in the load encoder 350). The actuator components are connected to the leg frame 370, and it may include a sprocket at the output of the harmonic drive that attaches to the linear springs through a serial chain. Small threaded rods may be used at the attachment points to pre-tension the springs to avoid backlash. The motor's output shaft is attached to a harmonic drive, which is housed inside the leg assembly. A load encoder may be used to measure angular displacement between the motor shaft and the hip link (e.g., to provide the angle sensor 118 of robot 110 of FIG. 1). This translates into an equivalent linear spring deflection, which is then used to compute the torque at the hip (e.g., to provide joint sensor data 162 stored in memory 160 in FIG. 1).

When the SEA applies torque, the chain/pulley mechanism causes one spring to compress while the other decompresses. In the limit, the decompressing spring will reach its rest length, at which point any further rotation of the motor will cause the spring to become loose and introduces backlash into the SEA. The amount of decompression a spring can achieve before loosening is determined by the pre-tensioning amount applied to the springs, thus determining a mechanical limit on the torque output of the actuator. In the following description, a discussion is provided of how this limitation affects push recovery experiments on a real or implemented robot.

The closed-loop torque control bandwidth of the SEA design was tested using a chirp signal (e.g., sine wave with linearly increasing frequency) at 1 Nm and 5 Nm peak-to-peak desired torque values. The closed-loop torque control bandwidth of the actuator at 1 Nm peak-to-peak torques was approximately 43.5 Hz and for 5 Nm peak-to-peak torques was approximately 20.4 Hz. This is substantially higher than the closed-loop bandwidth reported in others' research, and it is believed that a determining factor is the peak current sourcing capability of the motor current controllers. In the inventor's experiments, each motor controller was manually limited to 15 Amps maximum (out of a possible 40 Amps).

The robot 110 includes a processor or CPU 120 that operates to manage the memory 160 (e.g., store and retrieve data in digital form) and to run one or more programs (non-transitory computer readable medium). For example, the processor 120 runs a robot controller 130 to control operations of the robot 110 including outputting control signals or joint torques 138 to control the drivers/electric motors of the robot's hardware assembly 111. Generally, the joint torques 138 are output from an actuator controller 136 based on desired joint torques 169 stored in memory 160, with the desired joint torques 169 being generated by the controller 130 based on the joint sensor data 162, optionally the IMU data 164, the physical model 166 of the robot 111 (e.g., torque constraints of the drivers 116 and the like), and contact sensing from the foot.

More specifically, the robot controller 130 includes a foot placement algorithm 132, a gait generator 134, a torque calculation module (or torque calculator) 135, and an actuator controller 136. Briefly, the foot placement algorithm 132 produces a desired foot-hold location 167. The gait generator 134 is adapted to output desired joint trajectories 168 for each of the joints 114, with the trajectories 168 designed to track the desired foot-hold location 167 output by the foot placement algorithm 132. The torque calculation module 135 is configured to determine and output desired joint torques 169 that are designed to track the desired joint trajectories 168 from the gait generator 134. The actuator controller 136 is configured to produce with control signals 138 the desired joint torques 169 on the robot 110 via operation of the drivers/actuators 116.

At this point, it may be useful to discuss in more detail the foot placement algorithm 132, the gait generator 134, and the torque calculator 135 and the inventor's new ideas for these components of a robot controller 130. The foot placement algorithm 132 is configured with the knowledge that the robot needs to know where to place its foot in order to dynamically balance and walk. In one embodiment, the algorithm 132 is formulated or adapted to solve a nonlinear optimization problem to compute the foot-hold location 167. The goal of the nonlinear optimization procedure is to find the foot location on the ground (or foot-hold in the sagittal and frontal planes of the robot 110), which produces the desired center of mass velocity during the next step of the walking cycle, and additionally respects actuator limits.

The optimization procedure carried out by algorithm 132 accounts for the full walking dynamics of the robot (including leg-swing and ground collisions) and finds the foot-hold through forward prediction by using a mathematical model of the robot dynamics (e.g., physical model of robot 166) and of the ground collisions. Significantly, optimization constraints are also defined that guarantee that torque and joint limits are satisfied. If the optimization procedure carried out by algorithm 132 fails, a safe recovery should be implemented that brings the robot back to a safe state. Note, using the outputs from the gait generator 134 and the torque calculation module 135 for forward prediction during the optimization procedure, the search space of planar walking is significantly reduced to be one dimensional.

With regard to the gait generator 134, the foot placement location 167 from the foot placement algorithm 132 produces a point on the ground where the robot 110 should place its foot. The goal of gait generation by the gait generator 134 is to produce the joint motions that allow the robot 110 to achieve this foot-hold. During walking, the stance knee angle can be held straight but can also be modulated if desired.

In one embodiment of the gait generator 134, the inner leg angle trajectory is generated using a sine wave parameterized by a phase variable, which, in the simplest case, can be the time during a step. This generates a smooth trajectory connecting the inner leg angle right after touch down to the desired inner leg angle required for touch down at the computed foot-hold location 167 from the foot placement algorithm 132, found using inverse kinematics. The swing knee is then defined, in some embodiments of the gait generator 134, as a Bézier curve that is parameterized by the inner leg angle. The swing leg clearance with the ground/planar support and the general shape of the swing leg can be tuned to enhance operations/output 168 of the gait generator 134.

In order to produce the desired motions defined by the joint trajectories 168 generated by the module 134, the torque calculation module 135 is configured or adapted to compute the desired joint torques 169. For the stance and swing knees, the module 135 may be configured as a proportional-derivative (PD) torque controller to track the desired position. The torques 169 required to control the inner-leg angle and the torso angle are coupled and are significantly influenced by the dynamic movement of the entire robot 110. For these dynamic variables, a partial-feedback-linearization method may be performed by the controller module 135 to compute the required torques 169.

This partial-feedback-linearization method may use a mathematical model of the robotic dynamics (e.g., data in model 166) to compute the desired torques 169 needed to realize a given motion and may specifically take into account underactuation. This scheme may account for the stable PD controllers already applied to other joints 114, like the stance and swing knees, so as to only produce inverse dynamics torques 169 for the inner leg angle and the torso angle. This control component may be critical in some cases to accurately track the desired foot-hold locations on the physical robot 111.

With the general control method and examples of a robot 110 useful with such control methods understood, it may be useful to provide more detail on methods and experimental results regarding the gait generation and tracking methods for use with legged robots such as torque-controlled, biped humanoid robots.

Figure 5:
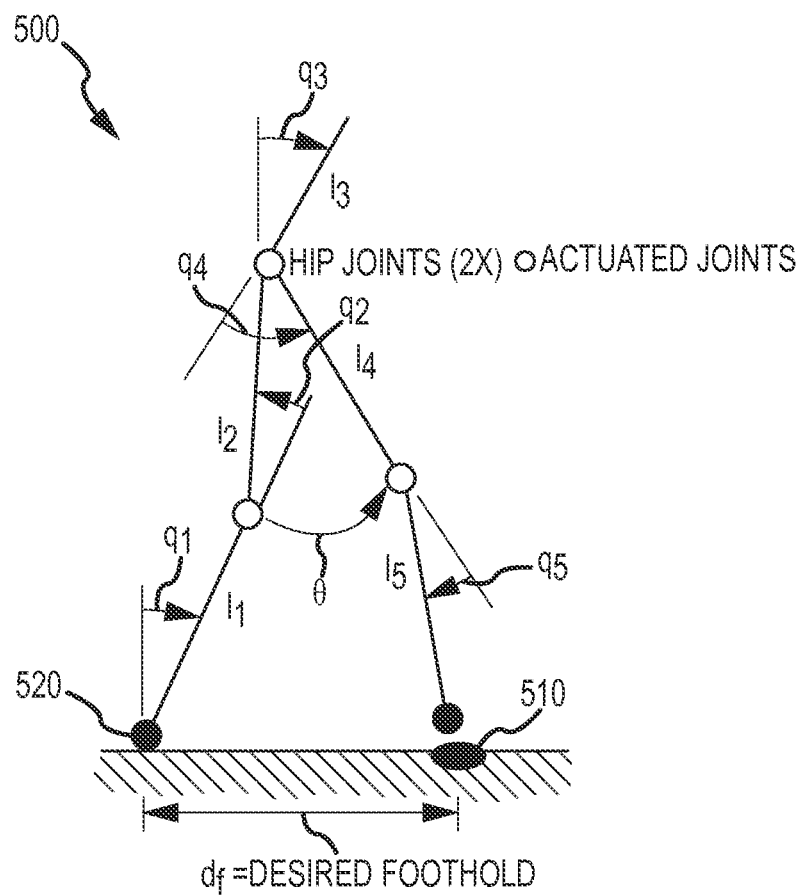
FIG. 5 illustrates a basic link structure of an exemplary robot, e.g., a five link planar walker, that may be controlled according to the foot placement with gait generation control method described herein.

With regard to robot modeling and simulation, the robot model was assumed to always have one foot pinned to the ground without slip. The basic link structure 500 of an exemplary robot is shown in FIG. 5. The link structure 500 is for a five link planar walker. The link structure 500 is labeled to show generalized coordinates and link numbering, which is used in the equations and discussion of the following paragraphs. The desired foot placement is shown in FIG. 5 under the swing foot at 510 at a distance, $d_f$, from the stance foot 520. The actuated joints are also shown with the link structure 500 of FIG. 5, and it should be noted that the two hip actuated joints would be separated by a torso link, $q_3$. In the present control method, steady walking is assumed to have two phases: a swing phase and a stance phase. Foot collisions with the ground are assumed to provide an instantaneous transfer of support from the stance leg to the swing leg, and, thus, a double-support phase is not modeled.

For simulation of the control method/model, a custom robot simulation toolbox was designed based on the Matlab/Simulink software packages. The toolbox made use of Matlab's symbolic math toolbox to automatically generate equations of motion for arbitrary n-link structures (e.g., planar models or the like). The toolbox also was adapted to automatically compute the impact equations during collision, i.e., Equation 3 shown below, assuming instantaneous and impulsive collisions with the ground and conservation of angular momentum about the impact point. The dynamics and control system of the robot were simulated by creating custom Simulink blocks, which call the simulation toolbox's generated code and by leveraging the Simulink variable step solver (ode15s within Simulink). As discussed in the following paragraphs, this simulation workflow allows one to use the same code in simulation as on the physical robot, which essentially runs a real-time version of the Simulink environment.

With regard to robot electronics and software, computation and power for the physical robot prototyped by the inventor were supplied from offboard in order to minimize weight, but the concepts taught herein apply equally to onboard implementations of a robot. In the prototype robot system, a Speedgoat Performance real-time target machine running Matlab's xPC Target software was used for controlling and sensing the robot. The xPC Target software allows one to run the same control code used in simulation, which could potentially include the auto-generated equations of motion used to simulate the robot(s) described above with reference to FIGS. 1-5.

This may be particularly useful for model-based control approaches. The control system described herein is generally not model based though, but it does allow the sharing of the exact same control code between simulation and the physical robot.

The xPC Target software that ran on the real-time computer communicated with four Elmo motor controllers (e.g., two for the hips and two for the knees) sitting onboard the robot such as through two 1 Mbit/s CANbus lines, i.e., two motor controllers per CANbus. Desired motor positions and velocities were communicated to the motor controllers at a rate of 1 KHz through CANbus using the Position-Velocity-Time (PVT) interface of the motor controllers. There were four motor incremental encoders and four output incremental encoders for the hips and knees, and an additional incremental encoder, which measured the rotation of the torso relative to the boom. All nine encoders were routed from the robot back to the real-time computer for state estimation at a rate of 4 KHz. Joint velocities were filtered using a first-order Butterworth low pass filter with 6 Hz cutoff frequency. Force sensing resistors (FSRs) located in the feet of the robot were used to measure forces along the axis of the leg, which allowed foot collisions with the ground to be accurately detected.

At this point in the description, it may be useful to provide further details of a planar walker or biped robot that may be controlled using the control methods and robot controllers taught herein. As shown with link structure 500 of FIG. 5, the controlled robot may be a five-link, planar, bipedal robot whose sagittal plane dynamics are given by:

$$M(q)\ddot{q}+C(q)+g(q)=\tau \qquad \text{Equation (1)}$$

where q is the joint angle vector, M(q) is the joint space inertia matrix, C(q) contains Coriolis terms, g(q) is the gravity vector, and τ is the joint torque vector. FIG. 5 shows the coordinate labeling for this robot 500.

The continuous phase dynamics of walking can be written as:

$$x=f(x,u) \qquad \text{Equation (2)}$$

where $x=[q\ \dot{q}]^T$ denotes the state of the robot. The continuous phase dynamics are punctuated by discrete impact equations which map the pre-impact state x- to the post-impact state x given by:

$$x^+=\Delta(x^-) \qquad \text{Equation (3)}$$

where the impact mapping Δ applies discrete velocity discontinuities due to impacts and also relabels the joint coordinates q so that the swing leg becomes the stance leg and vice versa.

Now, it may be useful to turn to a discussion of gait generation and tracking as part of a control method (or as steps/functions performed by a robot controller for a legged robot). With regard to gait generation (which may be performed by the gait generator 134 of controller 130 of FIG. 1), a goal of gait generation is to produce the desired joint trajectories that will allow the robot to track a given foot-hold location given by one of the foot placement strategies described below.

During walking, the stance knee angle can be held straight, i.e., $q_1^d=0$, but can also be modulated if desired. Then, $\theta^+=(q_3^++q_4^+)$ can be used to represent the inner leg angle right after touchdown, and $\theta_f$ used to represent the final desired inner leg angle required to achieve the foothold, which is found using inverse kinematics. The desired instantaneous inner leg angle is given by a liner Bézier Curve as:

$$\theta_d=(1-\alpha_{il})\theta^++\alpha_{il}\theta_f \qquad \text{Equation (4)}$$

where the Bézier parameterization variable $\alpha_{il} \in [0,1]$ is given by:

$$\alpha_{il}(t) = 1/2\left[\sin\left(\frac{\pi}{T}\min(t,T)+\frac{3\pi}{2}\right)+1\right] \qquad \text{Equation (5)}$$

Where T is the desired swing time and t is the current step time. Alternatively, this sine wave may be parameterized by a different phase variable, such as stance leg angle. In the inventor's experiments, parameterizing by time worked well in simulation and also on the physical robot (e.g., the walker prototype used to test the control method).

The swing knee trajectory is given by a quadratic Bézier Curve parameterized by the current inner leg angle $\theta_a=(q_5+q_4)$. Then, p can be used to represent the amplitude of the desired swing leg angle. Since the swing knee begins and ends at zero, the desired swing knee angle is given by:

$$q_5^d = 2(1-\alpha_{kn})\alpha_{kn}2p \qquad \text{Equation (6)}$$

where the Bézier parameterization variable $\alpha_{kn} \in [0,1]$ is given by:

$$\alpha_{kn} = -\left(\frac{h}{\theta^+}\right)\theta_a + h, \text{ if } \theta_a < 0 \qquad \text{Equation (7)}$$

$$\alpha_{kn} = \left(\frac{1-h}{\beta}\right)\theta_a + h, \text{ if } \theta_a \geq 0 \qquad \text{Equation (8)}$$

where h specifies the value of the Bézier Curve at $\theta_a=0$, and β specifies the inner leg angle at which the swing knee must be fully extended.

Now, with regard to partial-feedback linearization tracking control, the straight orientation of the stance knee as well as the swing knee trajectory, in one non-limiting implementation, were tracked using standard PD control, i.e. (with K representing gains):

$$\tau_2=-K_{P2}q_2-K_{D2}\dot{q}_2 \qquad \text{Equation (9)}$$

$$\tau_5 = K_{P5}(q_5^d - q_5) + K_{D5}(\dot{q}_5^d - \dot{q}_5) \qquad \text{Equation (10)}$$

The generalized coordinates were reordered. Then, the inventor separated the passive joints $q_p$, joints whose torques are directly specified (e.g., using PD control) $q_{dc}$, and joints whose torques are computed via partial-feedback linearization $q_{fl}$. The reordered coordinates are now $q=[q_p\ q_{dc}\ q_{fl}]^T$. For the biped walker, there is one passive degree of freedom at the contact point. Therefore, $q_p=q_1$. Both knee joints have specified torques through PD control, so $q_{dc}=[q^2\ q^5]^T$. Finally, partial-feedback linearization may be used to control the inner leg angle and torso angle, which means $q_{fl}=[q^3\ q^4]^T$.

The re-ordered inertia matrix can be written as:

$$M = \begin{bmatrix} M_{11} & M_{12} & M_{13} \\ M_{21} & M_{22} & M_{23} \\ M_{31} & M_{32} & M_{33} \end{bmatrix}$$

and the equations of motion are then given by:

$$M\ddot{q} + \phi = \begin{bmatrix} 0 \\ \tau_{dc} \\ \tau_{fl} \end{bmatrix} \quad \text{Equation (11)}$$

where φ contains all Coriolis and gravitational terms. Since control of the inner leg angle and torso are coupled, a combined control law was defined that allows the accurate tracking of both. The desired accelerations of the hip $h_c$ and torso $t_c$ were specified by:

$$h_c = K_{P1}(\theta_d - \theta_a) + K_{D1}(\dot{\theta}_d - \dot{\theta}_a) \quad \text{Equation (12)}$$

$$t_c = K_{P2}(torso_d - torso_a) - K_{D2}(\dot{torso}_a) \quad \text{Equation (13)}$$

Then, the desired acceleration vector was given by:

$$\ddot{q}_{fl}^d = [t_c (h_c - t_c)]^T. \quad \text{Equation (14)}$$

The final torques were given by the following (the last row of Equation 11):

$$T_{fl} = M_{31}\ddot{q}_p + M_{32}\ddot{q}_{dc} + M_{33}\ddot{q}_{fl}^d + \phi_{fl} \quad \text{Equation (15)}$$

where:

$$\ddot{q}_p = M_{11}^{-1}(\phi_p - M_{13}\ddot{q}_{fl} - M_{12}\ddot{q}_{dc}) \quad \text{Equation (16)}$$

$$\ddot{q}_{dc} = M_1^{-1}[\tau_{dc} - \phi_{dc} + M_{21}M_{11}^{-1}\phi_p - M_2\ddot{q}_{fl}] \quad \text{Equation (17)}$$

And $$M_1 = (M_{22} - M_{21}M_{11}^{-1}M_{12}) \quad \text{Equation (18)}$$

$$M_2 = (M_{23} - M_{21}M_{11}^{-1}M_{23}) \quad \text{Equation (19)}$$

At this point, it may be beneficial to discuss foot placement strategies (e.g., functions and processes carried out by the foot placement algorithm 132 of controller 130 in FIG. 1) in more detail. In this discussion, it may be useful to assume that the state of the robot is given by $\dot{q}^T$. Given a desired forward walking speed for the robot, $v_d$, specified at the robot's center of mass, it is desirable to find the foot-hold on the ground such that when the robot's foot touches down at this location and the robot follows a specified gait after touchdown, the desired center of mass speed will be obtained during the next step(s) of the walking cycle.

There are a number of methods that may be used to estimate a foot-hold or foot location on the ground. Existing methods rely on simplified inverted pendulum mathematical models to approximate the physics of a bipedal robot. These inverted pendulum models make oversimplifying assumptions about the physics of the walking robot, e.g., using straight massless legs and/or point masses to represent the multi-linked, distributed mass structure of the robot. Other existing methods more accurately model the bipedal robot as a multi-link, distributed mass mechanism but do not take into account the dynamics of the walking motion itself when computing a foothold (e.g., the motion of the swing leg during walking) Moreover, actuator limits are not accounted for in these existing approaches, which become important when applying the method to a real robot. Ignoring these dynamics and limits during foot-placement calculation can significantly impact the performance of walking and balancing of the bipedal robot. Push recovery on a real robot can be performed based on a 3D linear inverted pendulum model (LIPM) with a finite foot.

In contrast, the inventor has proposed that foot placement (or foot-hold location prediction or generation) be generated using a computed foot-hold or foot location on the ground to achieve a desired walking speed. This foot-hold can be labeled or called the gait reference point (GRP). The inventor chose to evaluate the center of mass speed at the point where the horizontal component of the center of mass crosses the stance foot (with reasonably small bounds±ϵ), but one could easily choose a different point of evaluation, e.g., right after the foot collides with the ground.

Given a gait generator, G, the steady state walking speed can be pre-computed (offline) for any given foot-hold. This steady state foot-hold can be called $d_f^{ss}$. This pre-computed steady state foot-hold is used in the foot placement algorithm to compute (in real time) the current desired foot-hold, $d_f$. So, given a desired walking speed, $v_d$, and a steady state foot-hold, $d_f^{ss}$, that corresponds to $v_d$, one can compute the GRP by defining the following nonlinear optimization problem:

$$\underset{d_f}{\text{minimize}} \; J(d_f, v_d, d_f^{ss}(v_d)) = \underset{x_s}{\text{min}}\left(\frac{1}{2}(v_d - v_a(x_s))^2\right) \quad \text{Equation (20)}$$

subject to $x(0) = x_0$ $\dot{x} = f(x, u)$, if $h(x) \neq 0$ $x^+ = \Delta(x^-)$, if $h(x) = 0$ $|u_d| \leq c_u$ (torque limits)

$A_q < c_q$ (joint limits)

$d_l < d_f < d_u$ (limits on step length)

$-\epsilon < COM(x_s) < \epsilon$ where the s subscript in $x_s$ denotes a state of the robot after taking a single step, $h(x)=0$ represents the collision surface with the ground, the desired joint torques $u_d$ are a function of the gait generator used for foot placement tracking and feedback control, $d_l$ and $d_u$ are lower and upper limits on step length, respectively, and $COM(x_s)$ is the horizontal distance of the center of mass to the stance foot at the state $x_s$.

The optimum foothold, $d_f$, must minimize the cost function given in Eq. 20. Because this cost function minimizes over $x_s$, it is useful to simulate forward from the current state, $x_0$, for two steps, i.e., the forward simulation must experience two separate ground collision events before terminating. In forward simulation, the candidate foot-hold, $d_f$ is chosen as the target foot-hold for the gait generator, G, before the first collision event occurs. Once the first collision event occurs, the steady state foothold, $d_f^{ss}$, is chosen as the target for G, until the second collision event occurs. Then, one can choose $x_s$, such that the difference between the desired and actual horizontal velocity at $x_s$ is a minimum. The optimization procedure will determine whether the constraints are met and iterate until an optimum $d_f$ is found or the optimization fails. If the optimization fails, then a safe recovery strategy should be implemented that brings the robot back to a safe state.

The inventor performed several hardware experiments. With regard to steady walking, the tests showed the control methods with a planar walker were able to obtain steady walking on flat ground in both simulation and on the physical robot. Aesthetically, a qualitative comparison in the gait between simulation and the robot showed relatively little difference in the smoothness of the motion. The robot was able to continuously walk in a circle without falling. Although the floor of the laboratory where the experiments were performed appeared relatively flat, slight inclines/declines in the surface of the concrete floor caused the robot to slightly speed up and slow down during certain portions of the circle without falling, which indicates the control method is relatively robust.

Figure 6:
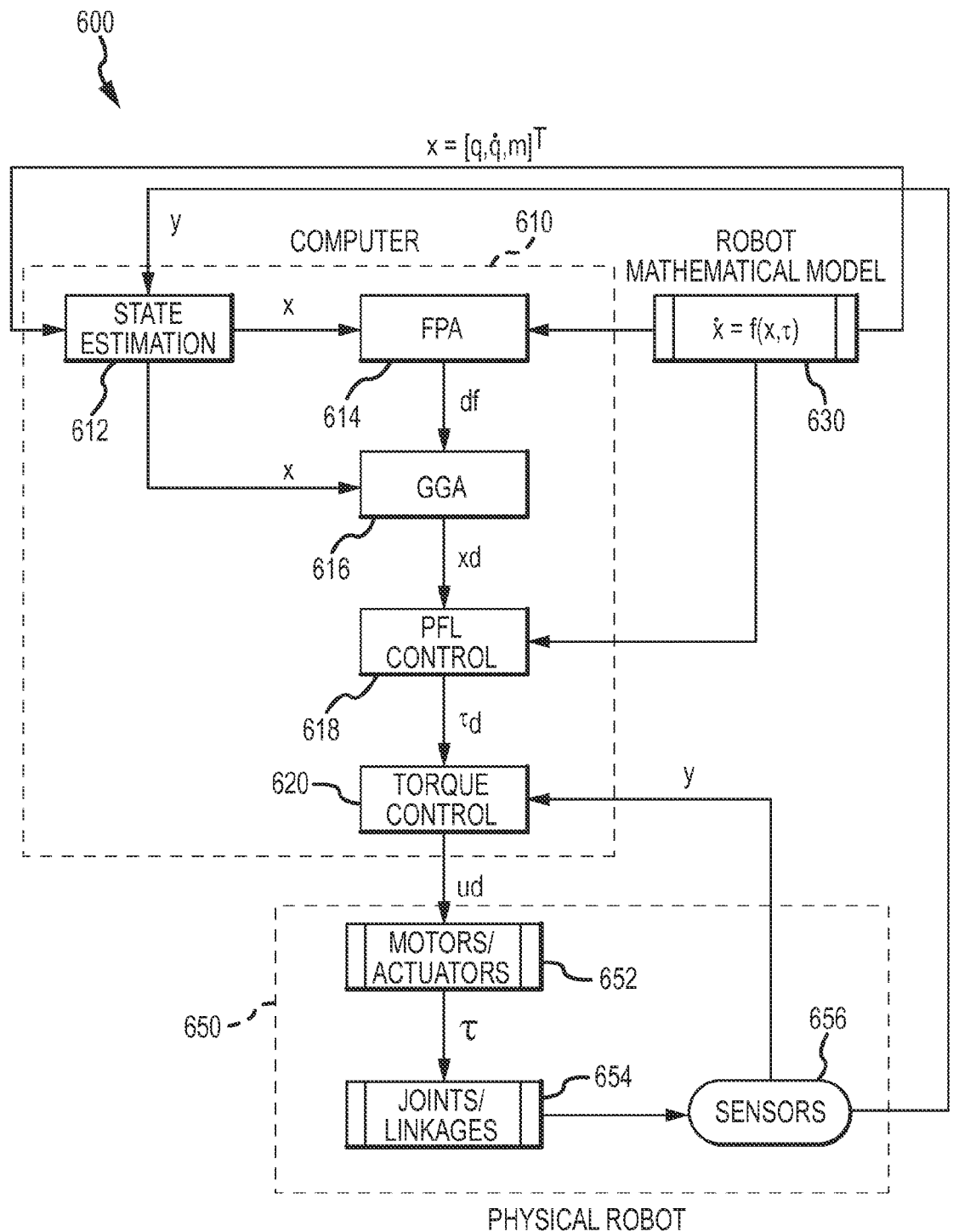
FIG. 6 illustrates a control and/or data flow diagram showing a control method performed by or operation of a robot controller according to the present description.

FIG. 6 illustrates a control and/or data flow diagram 600 showing a control method performed by or operation of a robot controller according to the present description (such as robot controller 130 of FIG. 1, with all or portions of the controller onboard the robot or communicating in a wired or wireless manner with offboard portions). As shown in diagram 600, the control method may be carried out with data flowing from a computer/controller 610, a robot or a hardware/software assembly 650 (e.g., a planar biped walker or the like), and memory providing data/information associated with a mathematical model 630 of the robot 650. The variables/data passed among the components of the flow diagram 600 are presented and defined in the previous sections (e.g., variables and their symbols should be consistent throughout this description).

As shown, the computer/controller 610 is operated to output control signals in the form of actuator/driver commands to provide joint torques, $u_d$, from a torque control module 620. These actuator commands, $u_d$, are communicated to the physical robot 650 (in a wired or wireless manner) to control operation of motors/actuators 652 associated with each joint of the robot 650, and the motors/actuator 652 generate torques or actual torques, $\tau$, applied to the joints/linkages 654 to cause the robot to move (i.e., walk) in a controller manner to each next foot-hold location. Sensors 656 provided on the robot 650 (e.g., on the joints/linkages 654) operate to measure actual movements and link angles (or present state of the robot in the physical world/environment), with the sensor signals, y, and state of the robot, x, being communicated to the computer/controller 610 such as to the state estimation module 612.

The state estimation module 612 processes the sensed/measured state of the robot from sensors 656, and the processed state data is concurrently provided to the FPA 614 and to the GGA module 616. The FPA (foot placement algorithm) module 614 further takes as input the mathematical model 630 of the robot 650 and acts to generate the desired foot-hold location, $d_f$, which is provided with processed state data to the GGA (gait generation algorithm) module 616. The GGA module 616 processes these two inputs to generate joint trajectories or the gait so as to achieve a desired state of the robot, $x_d$, which is passed to the PFL (partial feedback linearization) control module 618 along with data from the robot mathematical model 630. The PFL control module 618 processes these inputs to provide desired torques, $\tau_d$, for the robot's joints, which are passed to the torque control module 620 to create control signals, $u_d$, for the robot's joints/actuators 652.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

The control methods taught herein provide a number of advantages over prior techniques. The foot placement algorithm described is novel and produces a foothold which can be labeled the Gait Reference Point (GRP), and the algorithm can be called the GRP method. The GRP method leverages a mathematical model of a bipedal walking robot, assumed to be a multi-linked, distributed mass mechanism. Contrary to existing methods, the GRP method then uses this model for forward prediction (i.e., simulation) in an optimization procedure to compute footholds based on a desired walking speed. Given a desired walking speed for the robot, the GRP method executes a constrained non-linear optimization procedure that accounts for the full walking dynamics of the robot (including leg swing and ground collisions) to compute a foothold. This foothold produces the desired center of mass velocity during the next step of the walking cycle and, additionally, respects actuator limits.

The idea of gait generation is not new and involves producing desired joint trajectories for the bipedal robot based on some higher level input to the controller. However, the way the generated gait is computed according to the teaching herein is new. In other words, the gait generator implemented here uses the GRP as an input, in addition to leveraging kinematic relationships between the GRP and a specified walking gait to produce the desired joint trajectories.

Further, the inventor recognizes that torque calculators are ubiquitous in the field of robot control. In this regard, partial feedback linearization (a.k.a., inverse dynamics control) is a general way of implementing a torque calculator. However, the way a torque calculator is used or applied in the present application is unique. In the described implementation, a PD controller is applied to all non-dynamically changing joints to compute their desired torques. These torques are then used as input to a partial feedback linearization scheme to facilitate the calculation of desired torques for the dynamically changing joints. This idea of specifying torques to a subset of joints and using those torques as input to a partial feedback linearization calculation provides enhanced results, particularly in hardware experiments, and was not shown by prior torque calculators or their uses.

The gait generator described herein may be thought of as using inverse kinematics to determine movements of the robot to obtain foothold locations. There may be numerous ways to perform gait generation so the embodiments of the generator may apply some constraints such as leg angles between the stance and swing legs, clocking between legs/leg movements, locking of the stance knee, and so on. The controller may use inverse dynamics control techniques for the torque controller, and this may be done, optionally, with some joints (such as the stance knee) constrained. The foot placement module may use the output from the gait generator to know how the robot moves to better determine foothold locations as this added information (relative to other control methods) enables better predictions.

Several techniques are available to implement the systems and methods discussed in this specification. These techniques and/or devices include, but are not limited to, digital computer systems, microprocessors, application-specific integrated circuits (ASIC), general purpose computers, programmable controllers and field programmable gate arrays (FPGAs), all of which may be generically referred to herein as "processors." For example, in one embodiment, signal processing may be incorporated by an FPGA or an ASIC, or alternatively by an embedded or discrete processor. Therefore, other embodiments of the present invention are program instructions resident on computer readable media which when implemented by such means enable them to implement various embodiments. Computer readable media include any form of a non-transient physical computer memory device. Examples of such a physical computer memory device include, but are not limited to, punch cards, magnetic disks or tapes, optical data storage systems, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL).

It will be understood that legged locomotion research has been ongoing for decades with attempts to provide controllers that dynamically balance the robot during walking. There are various methods that have been proposed for generating controllers for bipedal walking robots, such as ZMP control, hybrid zero dynamics, and virtual model control. Contrary to the subset of existing control approaches which rely on foot placement calculation, the presently described method provides a more accurate estimate for the desired foot placement by using forward prediction through non-linear optimization, taking into account the full physics of the generated motion.

I claim:

1. A method for controlling a legged robot with torque-controlled or position controlled joints, comprising:
   determining a foot hold location on a support surface for a foot of the legged robot;
   generating a set of joint trajectories for joints of the legged robot to achieve the foot hold location;
   computing desired torques to provide the set of joint trajectories; and
   generating actuator commands to operate actuators on the legged robot to provide the desired torques to move the foot of the legged robot to the foot hold location,
   wherein the determining of the foot hold location includes performing nonlinear optimization with forward simulation using the state of the legged robot as a first input and a mathematical model of the legged robot providing constraints for the nonlinear optimization as a second input.

2. The method of claim 1, wherein the determining of the foot hold location is performed based on a predictive forward simulation of full robot dynamics of the legged robot and wherein the generating of the set of joint trajectories is performed as a function of the foot hold location.

3. The method of claim 1, wherein the computing of the desired torques includes partial feedback linearization including applying proportional-derivative control to a subset of the joints.

4. The method of claim 3, wherein the partial feedback linearization includes using a dynamic model of the legged robot to compute partial feedback linearization torques based on desired torques of the subset of the joints that are not dynamically changing in desired trajectories for a number of the joints with dynamically changing trajectories.

5. The method of claim 1, wherein the nonlinear optimization includes performing forward prediction using the mathematical model of the legged robot including robot dynamics and a model of ground collisions between the foot and the support surface including energy losses during the ground collisions.

6. The method of claim 1, wherein the constraints include torque limits of actuators or motors driving the joints of the legged robot.

7. The method of claim 1, wherein the generating of the set of joint trajectories is performed with a stance knee locked in a straight position.

8. The method of claim 1, wherein the generating of the set of joint trajectories involves generating an inner leg angle trajectory using a sine wave parameterized by a phase variable.

9. The method of claim 8, wherein the phase variable is an amount of time elapsing during a step of the legged robot.

10. The method of claim 1, wherein the generating of the set of joint trajectories further comprises defining movement of a swing knee as a Bézier Curve parameterized by the inner leg angle trajectory.

11. The method of claim 1, wherein the computing of the desired torques includes using a proportional-derivative (PD) torque controller to track the foot hold location and further using partial-feedback linearization.

12. The method of claim 11, wherein the partial-feedback linearization uses a mathematical model of dynamics of the legged robot to compute the desired torques based on under-actuation of the drivers of the joints.

13. A robot controller for providing actuator control signals to motors or actuators used to drive joints or linkages of a legged robot during walking on a surface, comprising:
   a foot placement algorithm module generating a foot-hold location on the surface for a foot of the legged robot, wherein the foot-hold location is generated by processing a state of the legged robot and a set of dynamic constraints of the legged robot;
   a gait generation algorithm module generating a desired state of the legged robot based on the foot-hold location and the state of the legged robot; and
   a torque control module generating commands to the motors or actuators of the legged robot to achieve the desired state of the legged robot including positioning the foot at the foot-hold location on the surface.

14. The robot controller of claim 13, further including a partial feedback linearization module processing the desired state of the legged robot concurrently with a model of the dynamics of the legged robot to produce desired torques for the motors or actuators to achieve the desired state of the legged robot, wherein the torque control module generates the commands based on the desired torques.

15. The robot controller of claim 13, wherein the set of dynamic constraints include torque limits and joint limits.

16. The robot controller of claim 15, wherein the foot-hold location is determined by estimating a 1-step capture point using nonlinear optimization.

17. The robot controller of claim 13, wherein the generating of the desired state of the legged robot is performed by holding the stance knee straight and by defining an inner leg angle to achieve the foot-hold location as a linear Bézier Curve.

18. The robot controller of claim 17, wherein the Bézier parameterization variable of the linear Bézier Curve is defined by a sine wave that is parameterized by a desired swing time and a step time or that is parameterized by stance leg angle.

19. A method for controlling a bipedal robot, comprising:
with a processor running a foot placement algorithm, determining a foot hold location for the biped robot based on a sensed present state of the bipedal robot and on a mathematic model of the biped robot including torque limits and joint limits;
with the processor running a gait generator, generating a desired movement for the bipedal robot to move a foot of the bipedal robot to the foot hold location;
with a torque calculator module run by the processor, determining desired torques for joints of the bipedal robot to achieve the desired movement of the bipedal robot; and
generating actuator commands to operate actuators on the bipedal robot to provide the desired torques on the bipedal robot.

20. The method of claim 19, wherein the determining of the foot hold location is based on a predictive forward simulation of full robot dynamics for the bipedal robot.

21. The method of claim 19, wherein the generating of the movement includes defining joint trajectories for the bipedal robot by generating an inner leg angle trajectory using a sine wave parameterized by a phase variable and by defining movement of a swing knee as a Bézier Curve parameterized by the inner leg angle trajectory.

22. The method of claim 19, wherein the determining of the desired torques includes using a proportional-derivative (PD) torque controller to track the foot hold location and further using partial-feedback linearization comprising using a mathematical model of dynamics of the bipedal robot to compute the desired torques.

23. The method of claim 22, wherein the PD torque controller applies control to a subset of the joints of the bipedal robot that are not dynamically changing in desired trajectories and wherein the mathematical model of dynamics is used to compute the desired torques, based on the desired torques for the subset of the joints, for a number of the joints of the bipedal robot with dynamically changing trajectories.

* * * * *